(12) United States Patent
Autio et al.

(10) Patent No.: US 11,824,494 B2
(45) Date of Patent: Nov. 21, 2023

(54) SOLAR POWER OPERATED ACTUATOR SYSTEM CONTROLLED BY A SOLAR CONTROLLER

(71) Applicant: LEHTOVUORI OY, Ylöjärvi (FI)

(72) Inventors: Petri Autio, Ylöjärvi (FI); Yrjö Ojanen, Ylöjärvi (FI); Eero Ojanen, Ylöjärvi (FI)

(73) Assignee: LEHTOVUORI OY, Ylöjärvi (FI)

( * ) Notice: Subject to any disclaimer, the term of this patent is extended or adjusted under 35 U.S.C. 154(b) by 485 days.

(21) Appl. No.: 16/982,945

(22) PCT Filed: Mar. 22, 2019

(86) PCT No.: PCT/EP2019/057254
§ 371 (c)(1),
(2) Date: Sep. 21, 2020

(87) PCT Pub. No.: WO2019/180211
PCT Pub. Date: Sep. 26, 2019

(65) Prior Publication Data
US 2021/0021232 A1    Jan. 21, 2021

(30) Foreign Application Priority Data
Mar. 22, 2018   (FI) ...................................... 20185277

(51) Int. Cl.
*B30B 15/14*   (2006.01)
*B65F 1/14*    (2006.01)
(Continued)

(52) U.S. Cl.
CPC ................ *H02S 40/38* (2014.12); *B30B 1/02* (2013.01); *B65F 1/1405* (2013.01); *H02S 50/00* (2013.01);
(Continued)

(58) Field of Classification Search
CPC ....... B30B 1/02; B30B 15/148; B30B 9/3007; B30B 9/3046; B65F 1/1468; B65F 1/0033;
(Continued)

(56) References Cited

U.S. PATENT DOCUMENTS 9,352,887 B2 * 5/2016 Poss ...................... B65F 1/1473
9,882,528 B2 * 1/2018 Wolter ...................... H02J 3/32
(Continued)

FOREIGN PATENT DOCUMENTS

EP     2 955 133 A1   12/2015
WO     2004/110659 A2  12/2004

OTHER PUBLICATIONS

International Search Report for PCT/EP2019/057254 dated Jul. 2, 2019, 3 pages.
(Continued)

*Primary Examiner* — Jimmy T Nguyen
(74) *Attorney, Agent, or Firm* — NIXON & VANDERHYE

(57) ABSTRACT

The embodiments of the disclosure concern solar power operation controller to control a solar operated actuator system. An embodied solar controller, of a solar power operated actuator system, includes, an input for power feed from a solar panel for the solar controller powering, at least one sensor input in an ensemble of sensor inputs for providing sensor data to the solar controller, a functional connection to control a solar panel produced electricity for an accumulator charging, a functional connection to control accumulator laden charge for an actuator operation.

11 Claims, 3 Drawing Sheets

Figure 1A:
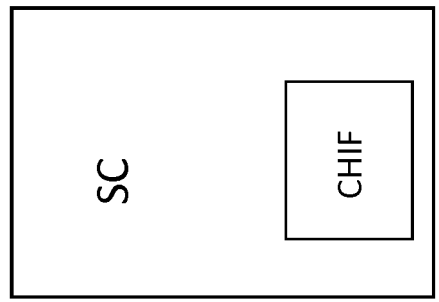

(51) Int. Cl.
   *H02S 40/38* (2014.01)
   *H02S 50/00* (2014.01)
   *B30B 1/02* (2006.01)

(52) U.S. Cl.
   CPC ....... *B30B 15/148* (2013.01); *B65F 2210/172* (2013.01)

(58) Field of Classification Search
   CPC .............. B65F 1/1405; B65F 2210/172; B65F 1/1426; Y02E 10/50; Y02E 70/30; Y02W 30/10; Y02P 70/10; H02S 40/38; H02S 50/00
   See application file for complete search history.

(56) References Cited

U.S. PATENT DOCUMENTS

| | | | |
|---|---|---|---|
| 2007/0209529 A1* | 9/2007 | Poss | ........................ B30B 9/305 100/229 A |
| 2010/0082171 A1 | 4/2010 | Takehara et al. | |
| 2015/0101499 A1 | 4/2015 | Hitchcock et al. | |
| 2016/0036235 A1 | 2/2016 | Getsla | |

OTHER PUBLICATIONS

Written Opinion of the ISA for PCT/EP2019/057254 dated Jul. 2, 2019, 4 pages.
Office Action issued in European Patent Application No. 19 713 443.0, dated Nov. 30, 2022.

* cited by examiner

SOLAR POWER OPERATED ACTUATOR SYSTEM CONTROLLED BY A SOLAR CONTROLLER

CROSS-REFERENCE TO RELATED APPLICATIONS

This application is the U.S. national phase of International Application No. PCT/EP2019/057254 filed Mar. 22, 2019 which designated the U.S. and claims priority to Finnish Application No. 20185277 filed Mar. 22, 2018, the entire contents of each of which are hereby incorporated by reference.

FIELD

Disclosure concerns embodiments of the invention about solar power operated actuator in general level. More specifically the embodiments concern such an actuator system that is disclosed in an independent claim directed to such. Even more specifically the embodiments concern such a solar operated actuator system that is controlled by a solar controller according to an independent claim directed thereof. Embodiments also concern use of a solar controller as a system element in such a system that comprises a press for compressing.

BACKGROUND

Solar power is available everywhere in the world, however, with constraints dictated by the rotation of the Earth with the inclined rotation axis and the orbiting around the Sun. Therefore, there is free energy available for anyone capable to convert the sunlight to electricity, for example, for a storage and use in suitable time, according to the local coordinates on Earth and the position in respect to the Sun locally.

The light-electricity conversion is made normally by a photovoltaic panel, comprising photovoltaic cells, considered as solar panel, irrespectively of the panel size as such. Electricity is directed via a controller electronics for storage in accumulator unit, which can be a single unit or such a unit that have a plurality of single units. Both are considered as examples of storage units as such.

As the electricity is stored in accumulators, the electricity mode is therefore DC current that is available from such an accumulator. Electricity from such a storage can be utilized at its most by using minimum further conversions between the modes of the available current (DC-AC or AC-DC). One desired converted form of electric energy is for example, a conversion to energy of a mechanical movement, by a suitable actuator.

One ensemble of examples of such actuators are motors, especially DC-motors as such, that can be operated by the accumulator voltage, if so design for suitable voltage. Such a motor is used to convert electricity of the stored electrical power to mechanical movement, which can be rotational movement or a translational movement of a certain type of motors.

In areas or locations thereof, where there is no AC-electric power distribution line available as such, electric devices, including the motors as actuators, are most often designed to be operated by (an aggregate or) battery. In case of cyclic operation with a power demand, actuators can be operated by an accumulator charged energy. Therefore, a sophisticated way for an automated system implementation for periodic operation without fuel refill issues can be obtained by solar power charger that charges an accumulator as such with the help of a solar panel converting the sunlight energy to electric energy.

However, provided that the cycles are normally similar to each other, when repeated, but can be also very different from the usual average cycles, the accumulator loading can vary accordingly and consequently the charge can be emptied during a heavy loading period of a cycle. Also environmental conditions can influence to the accumulator and its capability to receive and/or give current.

On polar areas, for example, the Sun can be below horizon even months. Nevertheless, if an actuator is supposed to be operated during such period, and the actuator powering accumulator cannot be recharged by the solar panels receiving the sunlight, or there is only a marginal amount of sunlight available, the actuator operation may be uncertain for the next desired operation cycle of the actuator. If there were no sufficiently charge left and there is no sunlight available to recharge the accumulator, the operation may be partly made and causes may be unpredictable.

Same problems may occur also on other locations than polar areas, on a daily basis with a shorter dark periods and being dependent on intermediate periods of actuator operation cycles.

SUMMARY

It is an object of an invention to provide a novel solution to solve or at least mitigate such problems of the background solutions. The disclosure of the embodiments relate to solar power utilization for energizing actuators, for the storing in electricity for the use it in such actuators, reliably and predictable way, also on such periods and/or locations where the Sun is not shining comparably long periods and thus light is not always available in synchronism for the periodical need of an actuator to be operated.

The object of the disclosure is achieved according to an aspect of the invention by a Solar Operated Actuator System (SOAS, also as SOAS-system), comprising an embodied solar controller, according to an independent claim directed to such solar controller to be used in such a system.

Solar controller, of a solar power operated actuator system according to the disclosure comprises:
- an input for power feed from a solar panel for the solar controller powering,
- at least one sensor input in an ensemble of sensor inputs (sein) for providing sensor data to the solar controller,
- a functional connection to control a solar panel produced electricity for an accumulator charging,
- a functional connection to control accumulator-laden charge for an actuator operation.

Solar operated actuator system (SOAS) according to the disclosure comprises:
- solar controller having a functional coupling access to a solar panel, to an accumulator, and an actuator
- solar panel, having dimensions of width and length to determine the solar panel area, and a solar panel direction in respect to a Sun position,
- an accumulator coupled to the solar operated actuator system in control of a solar controller to provide power feed control to a coupled actuator from the accumulator,
- actuator to be energized by the accumulator in the control of the solar controller.

According to an embodiment of the disclosure, a solar controller of a solar operated actuator system (SOAS) comprises access to a solar panel in order to determine power up and power down of the solar controller directly by the electric current of the solar panel so that when a preset threshold of electric current has been achieved, that the solar panel is capable to feed, the controller makes a power up. Correspondingly, when there is not anymore sufficiently sunlight for the solar operated actuator system operations as judged by the accumulator state of charge, the solar controller makes a power down according to the threshold for the system parts other than the solar controller itself.

When the amount of sunlight decreases even further, the solar controller prepares and makes its own power down. The current thresholds have been selected to be used as indicators of available current based on the sunlight conversion to electricity, according to certain criteria the sunlight can charge the accumulator for the actuator operation. The thresholds can be used in deciding about the charging of the accumulator unit, and/or to prepare the SOAS system and/or the solar controller to a power down of itself too, when no more light and the consequential electricity were sufficiently anymore available for an actuator in the system and/or finally for the mere solar controller itself. The solar controller is so configured that when a connected solar panel produces sufficient operating power, the solar controller powers up, the solar panel so being operated and used as a solar switch to switch on (also to switch off, when too little sunlight available for the solar controller).

According to an embodiment the solar controller has been configured to power down the solar operated actuator system's other parts before its own power down in lack of electricity because of lack of light, if the light is not sufficiently available to recharge the accumulator for actuator operation successfully. According to an embodiment the solar controller has been configured to power up the solar operated actuator system's other parts after its own power up, when there is again light and thus electricity available for the solar controller, but also for the charging of the accumulators.

According to an embodiment variant of the disclosure, the solar controller comprises
   an accumulator access to measure and control the charging state of the accumulator,
   a sensor access to measure the current consumption, and/or a derivative of such, of a coupled actuator.

According to an embodiment variant accumulator and/or sensor access can be implemented via a functional coupling According to an embodiment, the functional coupling refers to such embodiment in which the solar controller is used to generate a latching signal to control a separate discharging interface there between the accumulator and the actuator.

According to an embodiment variant, the latching signal is a wired signal to such a discharging interface operating according to the control of the latching signal. According to a further embodiment variant, the latching signal is a wireless signal to such a discharging interface operating according to the control of the latching signal. The wireless signal can be optical signal or radio frequency signal. In case of wireless embodiment implementation, the solar controller and the discharging interface can have respectively a transmitter and receiver for the mutual communication for these system elements.

According to an embodiment, the actuator is an electromechanical actuator to be operated by a DC-current. According to a further variant of an embodiment, said actuator is a DC-motor or a unit that comprises such a DC motor. According to an embodiment variant, the said unit can comprise a gear, arranged to alter at least one of the following: a rotation direction, a rotation speed, and to alter a rotation movement to translation movement.

According to an embodiment of the disclosure, the power of the accumulator is measured via observing the loading characteristic curve of the accumulator.

In an embodiment, simultaneously when an actuator is loading the accumulator, its voltage starts to decrease and after ending of said loading the voltage starts to recover. According to an embodiment, the capability of the accumulator to be selected to the duty for the SOAS, it is determined by the capability to recover. In such an embodiments, a momentary low voltage value of the accumulator does not necessarily prevent an actuator in the system to operate. Instead, according to an embodiment variant, if the accumulator recovery turns out to be so bad that the next duty cycle of the actuator were not possible flawlessly with full actuator power, first the fed power to the actuator is limited, but so that basic measurements by sensor facilities of the system are maintained. Next, when the lowest criterion of recovery were not met anymore by the accumulator, in an embodiment the actuator is controlled to take a standby state in the control of the solar controller, and the actuator is controlled to wait the recharge of the accumulator as long time it needs to get the accumulator charged. According to an embodiment variant, the charging time is determined by the full charge in the environmental parameter defined conditions, but according to another variant by such a charge that is sufficient to the performance of the waiting operation of the actuator, after which the charging continues when sunlight is available.

According to an embodiment, the solar controller comprises a computer with at least one microprocessor, a volatile memory in the use of such a microprocessor for the operations of algorithms, sensor originating measurement data processing as well as use of the environmental parameters in optimization of the actuator performance according to optimization criteria.

According to an embodiment, the controller comprises a non-volatile memory for saving, preserving and logging the operation parameters, measured values of sensor data, algorithms, operation cycle characteristics for the actuator and/or for the accumulator, solar controller power ups and power downs and the related and associated parameters. The non-volatile memory can also store connection establishment data, so that the solar controller can use such for RF-connection to a cellular information network for messaging to a service and maintenance desk via a radio transmitter-receiver coupled with the solar controller in the system for communications.

According to an embodiment, optimization criteria can comprise at least one of the following:
   number of performance cycles of the actuator, especially in dark conditions,
   charging of the accumulator during availability of the sunlight,
   power up/power down order of the system elements in the system,
   effect of the environmental parameters to the mentioned,
   accumulator charge remaining,
   actuator current consumption and/or its derivative in respect to the accumulator charge remaining,
   a priority order of the optimization criteria.

According to an embodiment the solar controller comprise an environmental sensor access to sensors to measure at least one of the following environmental parameter: light flux, temperature, pressure, air humidity, wind speed.

According to an embodiment, an environmental parameter is used as a measurement data for the solar controller to calculate an estimated effect of the acute value of the environmental parameter to the charging state of the accumulator and/or the loading capacity for the next duty cycle. According to an embodiment variant, the wind speed data is used to determine the wind load to the solar panel. According to an embodiment, the solar controller is arranged to report at least one of the environmental parameter such as the wind load conditions at the last power up period and/or acute power up moment at the event of being powered up.

According to an embodiment the solar panel, to provide the access to power up the solar controller, is a separate solar panel than the solar panel operated in the accumulator charging. According to a further embodiment, such a separate solar panel is protected against snow or rain to provide at least stray light flux into the position of the separate solar panel.

According to an embodiment of the disclosure, the solar controller has an access for a Hall-sensor to measure magnetic fields. According to an embodiment, the Hall-sensor is used for determining an operation current of an actuator, such as a motor.

According to an embodiment, the current is measured by the Hall-sensor so that the motor loading in a saturation state can be observed from a loading characteristic curve calculated by the solar controller. This is important as when the actuator as exemplified by a motor, is driving for example a press, would only increase the current consumption without desired progress of the pressing member of such a press (piston for example), the state of the press is saturated, and there is no benefit of continuing the increasing of the power current feed to the motor, but the accumulator loading would cause a charge loss that leads to a shortened operation before the next charging. According to an embodiment in such a press as system elements of the embodied system, the microprocessor in the solar controller of the system is provided with an algorithm to observe the saturation loading as a turn-over-point as based on the Hall-sensor readings.

According to an embodiment, the algorithm is provided with a self-learning feature, so that the solar controller can adapt to the local position and so to optimize the system requirements according to the operation criteria and priority. According to an embodiment, such an algorithm has also configured to detect a sudden drop of the current consumption near the turn-over-point, so that for example with a press embodiment the actuator has operated for compressing something which has been broken because of the press, but otherwise, if a garbage press, the trash inside would have left some volume free, because of a fruit box for example, being in a volume wasting position, but was broken, and therefore the compression may continue until there were no such a drop to be observed by the algorithm.

Preferred embodiments are also disclosed in the dependent claims.

The usefulness is based on many things. The embodied system is fully automatic, except the service and maintenance, which are not necessarily needed before the SOAS system itself asks for help. The solar controller is configured to make estimates as based on the actuator operation needed power loading to the accumulator, whose charge and voltage characteristics are used to evaluate the capability for a successful next operation of the actuator. The solar controller also recognizes states of the actuator in which it only consumes charged power without essential benefit for the actuator's operational function and/or goal.

The solar controller being arranged to operate according to the solar panel operations, when current is available. Otherwise, the solar controller is in a deep standby state that facilitates that when the solar controller is configured before its own power down to do according to a predefined scheme preparations for the wake up, when there is again solar power sufficiently available for its operation, to continue its operation to control the SOAS system. At the preparations for the standby state, when power down is acute, the solar controller can also report the state of the actuator using system, so that the service and maintenance can do service actions if there would have been a need for the next operation. For example, in case of an actuator being a motor in such a SOAS system that uses the motor in a trash compression press for producing the force for pressing the trash, the service and maintenance team can for example empty the trash from the press if it was in a state that needs emptying at the power down event, during the standby state.

As used herein, unless otherwise specified, the use of the ordinal adjectives "first," "second," "third," etc., to describe a common object, merely indicates that different instances of like objects are being referred to and are not intended to imply that the objects so described must be in a given sequence, either temporally, spatially, in ranking, or in any other manner.

The word "exemplary" is used herein to mean "serving as an example, instance, or illustration." Any embodiment described herein as "exemplary" is not necessarily to be construed as preferred or advantageous over other embodiments.

As used within this document, the term "communicate" is intended to include transmitting, or receiving, or both transmitting and receiving. The term "communicating" as used herein with respect to a wireless communication signal includes transmitting the wireless communication signal and/or receiving the wireless communication signal. For example, a wireless communication unit, comprising an RF-device, which is capable of communicating a wireless communication signal, may include a wireless transmitter to transmit the wireless communication signal to at least one other wireless communication unit, and/or a wireless communication receiver to receive the wireless communication signal from at least one other wireless communication unit. For example, communication between the service and maintenance desk and the solar controller.

Word "amount" means in the application any positive integer number starting from one (1), for example one, two or three.

Word "ensemble" is referring to any positive integer number starting from two (2).

Wording "to comprise" has been used as an open expression.

FIGURES

Figure 1:
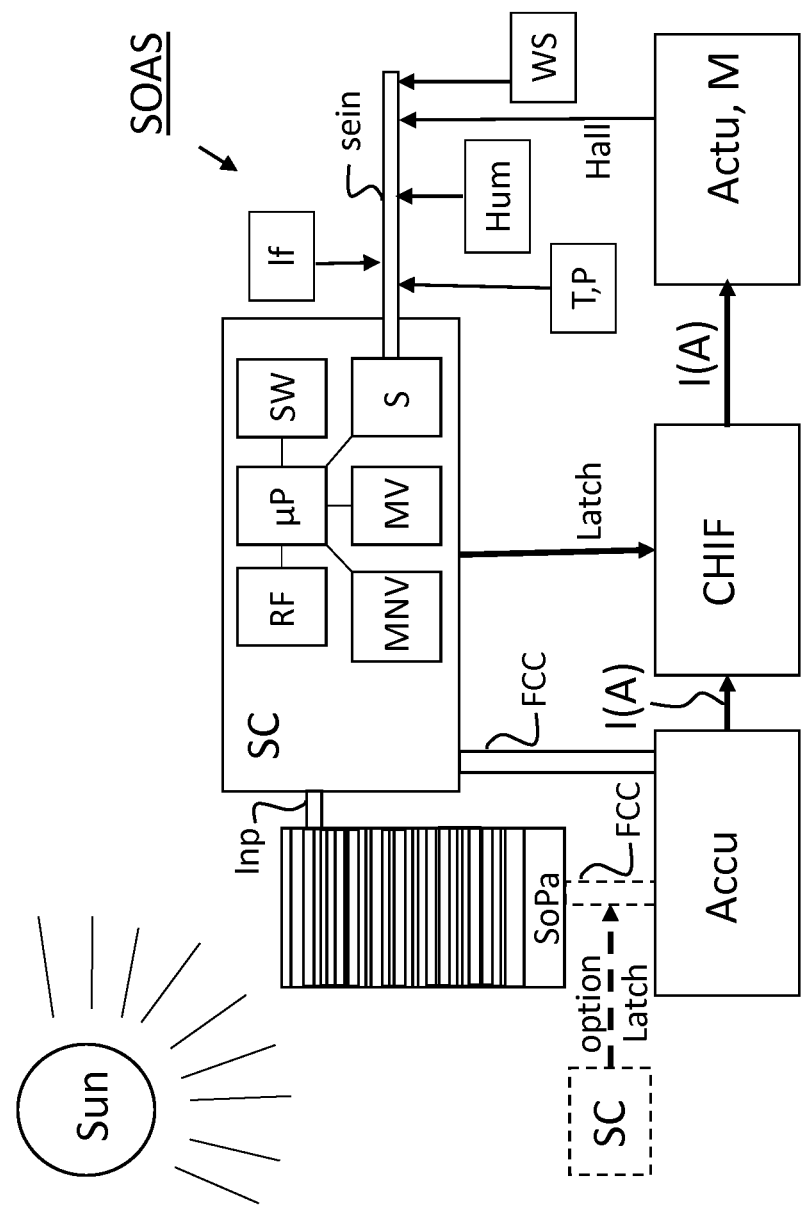
Figures 2, 3:
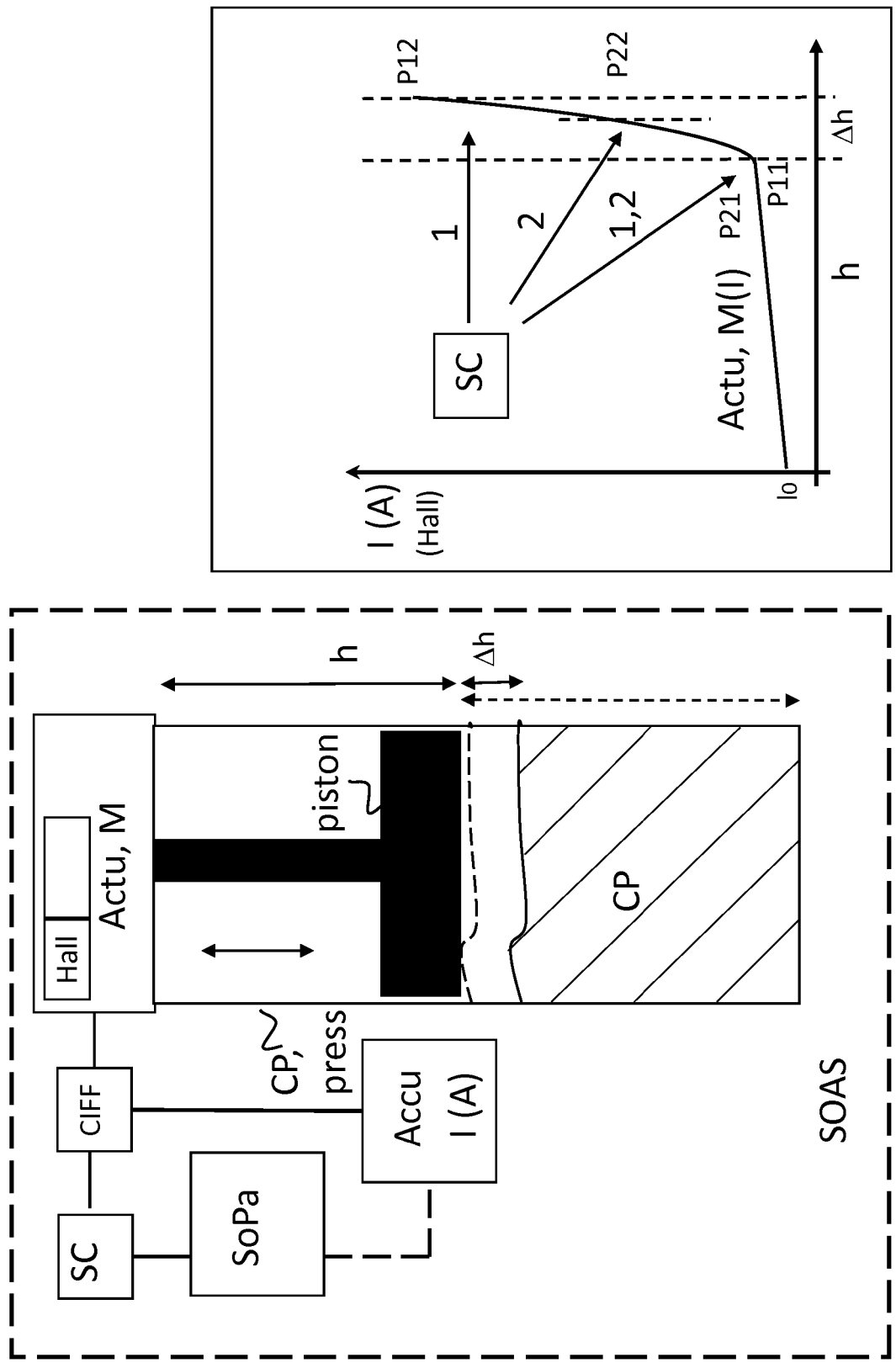
Figure 4:
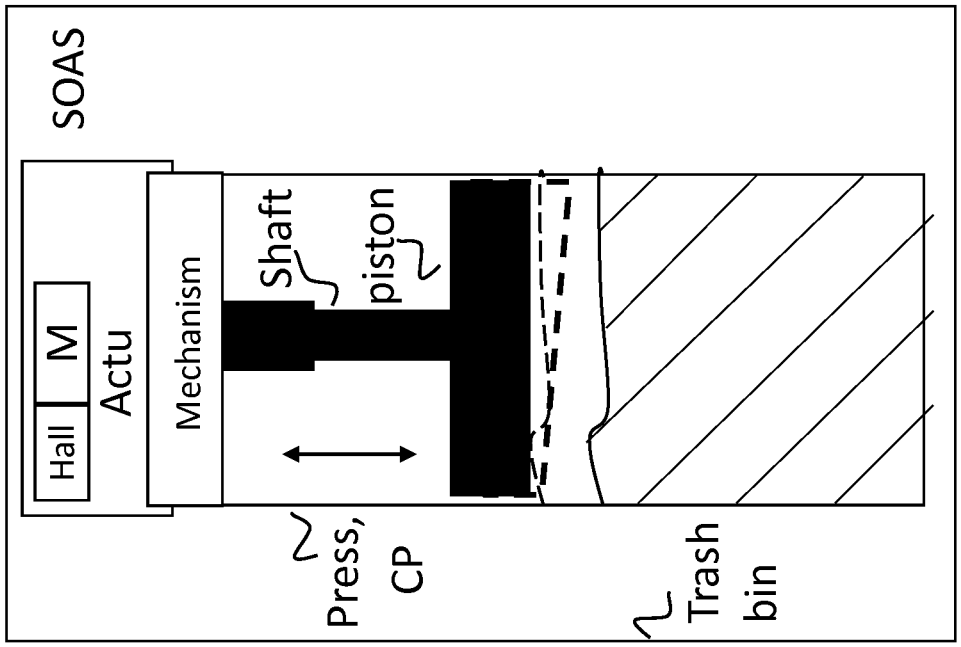
Figure 5:
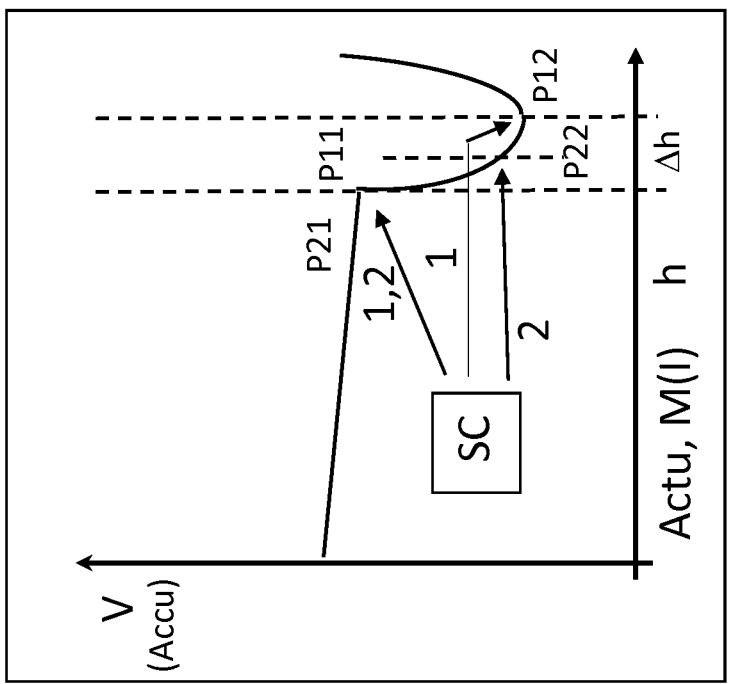
Figure 5A:
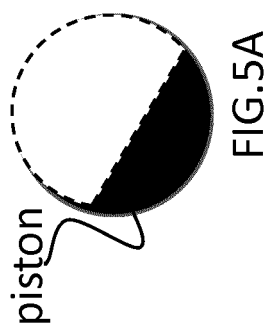

Examples on embodiments of the disclosure are shown in the following in a further detail, so that FIG. 1 illustrates an example of an embodiment according to the disclosure, FIG. 1A illustrates a variant of an embodiment, FIG. 2 illustrates another example of an embodiment according to the disclosure, FIG. 3 illustrates operation of an embodiment according to the disclosure, FIG. 4 illustrates operation of an embodiment according to the disclosure, FIG. 5 illustrates an example of an embodiment as a trash bin as a SOAS-system, and FIG. 5A illustrates a detail in an embodiment example variant of an embodiment.

A FURTHER DETAILED DESCRIPTION OF EXAMPLES OF EMBODIMENTS

FIG. 1. illustrates an example of an embodiment of a Solar Operated Actuator System (SOAS) comprising: a solar controller (SC), an actuator (Actu) to be operated by the accumulator (Accu) laden electricity in the control of the solar controller (SC), an accumulator (Accu) to store and discharge electricity for an actuator (Actu) of the system (SOAS), in the control of said solar controller (SC), at least one solar panel (SoPa) to provide electricity for charging of the accumulator (Accu) in the control of said solar controller (SC) and/or to said solar controller (SC) itself.

According to an embodiment of the disclosure, the solar panel SoPa is connected to the accumulator Accu via a functional connection FCC, so that the solar controller SC can control the charging. FIG. 1 illustrate an embodiment in which the solar controller SC takes it operational power via the same line (Inp) as the current is being directed to the accumulator.

According to an optional embodiment, the charging current can be directed from the solar panel SoPa to the accumulator by a separate routing, in a further variant via another, second, solar controller. The dashed line drawn objects in FIG. 1 are illustrative such embodiments.

The word "Latch" illustrates such an embodiment in which the charging interface CHIF is operated as a switch having a full conductivity for the current throughput in its (CHIF) on-state from the accumulator Accu to the actuator Actu, M, and isolate them in an off-state. According to an embodiment variant the "Latch illustrates also such embodiments where the conductivity is between the mentioned on-state and off-state as an intermediate state. According to an embodiment the solar controller SC is used to define the state of the charging interface CHIF, is it on-state, off-state or an intermediate state. At least in an intermediate state, the solar controller SC defines the current that is used to feed from the accumulator Accu to the actuator Actu.

According to an embodiment the Latch related operations can be implemented via a functional connection, so that the solar controller SC can be apart of the charging interface CHIF According to an embodiment example, the system SOAS comprises an ensemble of sensors (sein) arranged to provide measurement data (T, P), (Hum), (Hall) for the solar controller (SC) to be used in the optimization of the actuator (Actu) operation with the accumulator (Accu) laden electricity. T denotes temperature sensor, P to a pressure sensor, Hum to an air humidity sensor and Hall to Hall-sensor. Hall-sensor can be used in measurements of magnetic fields and therefore for sensing an embodied motor current as an actuator for example.

According to an embodiment example in FIG. 1, the solar controller SC can comprise a microprocessor μP for control actions, computing and data handling. According to an embodiment the μP is a microprocessor of a computer, provided with software SW for the operational instructions and algorithms for the SOAS operation and the optimization criteria and priorities. According to an embodiment, the solar controller can comprise volatile memory MV, but also a non-volatile memory MNV, for storing the software and data to be used in the operation and to be maintained over a power down-next power up period.

According to an embodiment example in FIG. 1 in the SOAS there is a solar panel SoPa, to be used in the conversion of sunlight (additionally also other ambient light, which may be marginal to the light of the Sun). The FIG. 1 illustrates that the solar controller takes its operation power directly from the solar panel. This is indicated by the reference numeral Inp.

According to an embodiment example in FIG. 1 there is a charging interface CHIF between the accumulator Accu that stores the energy from the solar panel SoPa and the actuator Actu. The arrows are indicative of the current direction. According to an embodiment, the solar controller SC is used to control the Charging interface, which is demonstrated by the arrow with nearby marked word "Latch". This is indicative that solar controller SC can control the current I(A) from the accumulator to actuator between the values of zero and the maximum current of the actuator. According to an embodiment the CHIFF can be used also as a mere switch, so that the Latch is in such embodiments used to open the CHIFF for current feed.

According to an embodiment example in the FIG. 1A, the solar controller SC can comprise the charging interface CHIF. The charging interface part can be coupled in suitable part according to the FIG. 1 there between the accumulator ACCU and actuator Actu.

According to an embodiment, the solar operated actuator system (SOAS) can have an ensemble of sensors (sein), in which there is at least one of the following: light flux sensor (lf), temperature sensor (T, P), pressure sensor (T, P), air humidity sensor (Hum), wind speed sensor (WS) and a Hall-sensor (Hall).

According to an embodiment an actuator Actu in the system (SOAS) comprises in the SOAS such an actuator (Actu) that comprises a DC-motor (M) of a type of rotational or translational type.

According to an embodiment example, the solar operated actuator system (SOAS) according to an embodiment comprises a garbage press (CP) in the SOAS system.

FIG. 2 illustrates schematically an embodiment example of the disclosure of a SOAS system. In the FIG. 2 the actuator Actu illustrates a motor M. The Hall-sensor is used in the embodiment to sense the magnetic field of the motor, and therefore to provide quantity to be used to determine the current of the motor. The motor in the embodiment is a DC-motor. It is possible to use an AC-motor instead of the DC-motor, provided that the SOAS has an inverter to provide the AC-current for the motor. However, the conversion losses from DC to AC voltages and current may be not wanted as to shorten the accumulator operational charge for the state in duty in the SOAS, and therefore a DC-motor is preferred in the example embodiment.

The solar controller is connected to the charging interface CIFF to control for adjusting and/or to latch the power feed from the accumulator Accu via the CIFF to the motor M. The motor M is coupled so that when turned on, the mechanical movement of the moving parts of the motor constitute movement of the piston illustrated by the object with the shape of black bold "T" upside down. A skilled person in the art can provide the mechanism according to the known techniques as such to convert a rotational movement for example to translator movement of the piston as such.

The solar panel SoPa is connected to the solar controller SC. According to an embodiment variant, the solar controller SC in FIG. 2 can control the charging interface CIFF so that the from-sunlight-converted electricity would be controlled to the accumulator Accu during a charging period. According to an embodiment, the charging can be performed when the press is in duty, provided that the CIFF, and/or the solar panel SoPa are/is protected by reverse spikes that may be potentially possible from the motor M, at the switch of and/or switch on. The dashed line between the solar panel SoPa and accumulator Accu demonstrate such an embodiment example in which they are directly coupled, and/or in which variant at least one of the solar panel SoPa and accumulator Accu itself has a charging controller, such as the charging interface CIFF.

The vertical two headed arrow in the press is illustrating a back and forth movement of the piston, according to the motor power feed. According to an embodiment, the motor M may comprise a sensor to indicate piston position from which the motor could reverse the operation direction to move to opposite direction in respect of the direction before the direction of the opposite direction. According to an embodiment, a Hall-sensor can be used as such a sensor.

FIG. 3 illustrates a piston stroke h of the press in the FIG. 2 example. In FIG. 2 garbage press has been about half full, which is indicated by the diagonal lines indicative of presence of trash in the press. The surface line is followed by a dashed line at a distance to illustrate surface of the trach at an instant filling event, before the piston stroke from its rest position at the box Actu, M. The $I_0$ schematically corresponds a leak and rest currents for a ready state for operation of the motor in the system.

The piston moves the distance h to meet the dashed line indicated trash surface. The Hall-sensor measures the current I(A) of the motor (FIG. 3) as a function of distance h. In the example, the current is indicated to be increasing line, but the actual shape depends on the content of the press and the shape and size of the objects therein, as well as the measurement algorithm that is logging the Hall-sensor readings. When the piston in FIG. 2 meets the trash surface, the piston meets a counter force by the trash constituents, which resist the compression according to the material composition dependent characteristics, i.e. different for paper, wood, metal etc.

The solar controller's SC microprocessor µP (FIG. 1) notices the increase in the Hall-sensor signal and deduces that the point P11 has been reached, where there is a noticeable resistance to the compression of the piston, as the motor current I(A) is about to turn to significant rising. The algorithm in the solar controller's microprocessor as run, allows current being taken from the accumulator via the charging interface CIFF to the motor M until the point P12 has been reached, corresponding a value of an increased current value of the motor, but also such a point in the trash compression, after which it is not anymore economic to press further, i.e. pressing beyond the compression parameter $\Delta h$ would practically consume the current from the accumulator, but the increase in the press free volume would be marginal. The compression parameter $\Delta h$ is a pre-defined value for the trash specific press, being programmed into the memory of the solar controller, or its computing unit and/or the memory thereof, to be used in the press operation. According to an embodiment, the algorithm (SW) in the microprocessor's use has a learning part, based on neural networks, for example, to allow individual adaptation to the local geographic way of using the actuator and the consequent compression parameter and need for a pressing, even on a time domain, (tourist season, weekend or other more quiet period).

The operational points P11 and P12 correspond a full compression of the press, when there is current sufficiently available in the accumulator for such. The solar controller calculates the accumulator loading characteristics. If they are indicative that the charging state of the accumulator is sufficiently high for a next compression event, as a full compression, such is scheduled to occur. The microprocessor is allowed to count how many strokes can be made according to the full compression scheme and the solar controller can send the related information according to a predefined schedule to the service and maintenance.

With the provision that the pre-defined accumulator specific characteristics of the loading and voltage restoration of the accumulator are indicative so, a full compression is made and the associated current is allowed to rise during the compression according to the intermediate values of the points P11 and P12, that define a full compression according to the compression parameter $\Delta h$.

Alternatively, if the power in the accumulator was estimated not to fully meet the compression parameter $\Delta h$, a shortened stroke corresponding with a smaller current consumption is scheduled according to the intermediate values of the points P21 and P22, which define a shortened compression according to the corresponding compression parameter. The corresponding operational points P21 and P22 are indicated in the FIG. 3.

The illustration is a momentary snap of a stroke. When the press is getting full, the stroke length h is getting shorter and shorter, and the points P11 and P21 are moving to left with the filling trash. Does the compression parameter $\Delta h$ remain, depends on the trashes them self to be put into the press. However, the solar controller's microprocessor can be configured to calculate the steepness of the curve therebetween the points P11 and P12 as well as points P21 and P22. This way, the alternation of a trash type from one type to another can be considered and the power consumption of the motor M (FIG. 2) evaluated accordingly to meet the capacity of the accumulator also during such periods when the sunlight would not be available to charge the accumulator instantly.

According to an embodiment example, when the solar controller notices that there is not sufficiently charge in the accumulator for a next meaning full stroke, according to the full stroke scheme or a shortened stroke scheme, the solar controller sets the press into a standby state to wait the charging state of the accumulator to meet such a state in which there is sufficiently power to be delivered to the motor M.

According to an embodiment variant, the solar controller itself reserves power for its own processes to prepare the SOAS to a power down, so that it is last system element to power down in the system. According to an embodiment the solar controller can report to the service and maintenance about the situation, how many full strokes has been made, how many shortened strokes has been made, give a statistical estimate about the accumulator's expected lifetime as based on the history information at the site as experienced with similar accumulator type, the steepness information about the compression parameter and motor current relation, as well as about the environmental readings about the operational environment at the site. According to an embodiment the reporting is made by the RF-connection to a cellular information network, to be used for messaging to a service and maintenance desk via a radio transmitter-receiver present in an embodiment variant.

Although FIG. 2 illustrates an example of a vertical piston movement based compression, according to an embodiment variant, a skilled person as such can implement a horizontal piston movement based compression as basing the press in to a SOAS-system implementation.

The FIG. 4 schematically corresponds the situation of FIG. 3, but as considered in terms of the accumulator voltage during the loading. The solar controller observes the loading curve, and calculates the charge of the accumulator from the loading curve as such and based on the result determines, is the next actuator operation in the SOAS system possible successfully according to a full performance or shortened performance cycle. Accordingly, the solar controller decides by the algorithm in the microprocessors memory, to do power down or continue the charging if necessary to continue until full charge of the accumulator.

FIG. 5 illustrates an example of an embodiment as a trash bin as a SOAS-system. The way of drawing is schematically illustrative embodiments in which the shaft connected mechanism, that is used to move the piston up and down in the compression, is connected to the actuator Actu comprising a motor M. Motor M takes its power from an accumulator as demonstrated in FIG. 2 for example in the guidance and control of the solar controller SC. According to an embodiment example, the Actu can comprise a gearbox arranged to transform the motor shaft movement speed, and/or direction. The Mechanism has been embodied as a coupling mechanism that allows the actuator Actu, or the gearbox part between the Mechanism and the motor comprising motor unit to be mechanically coupled. The mechanism is such a mechanism that allows the piston surface to move up and down in the press.

According to an embodiment, the mechanism can be implemented as in a priority application. According to an embodiment, the shaft connected to the piston and to the Mechanism can be embodied as having a telescopic structure. According to an embodiment, the piston and mechanism are connected with a compressible scissors like-structure to facilitate the movements up and down according to the motor unit M that can have also according to an embodiment a gearbox. According to an embodiment variant the Mechanism is partly a part the actuator Actu, if not entirely separate (except the movement facilitating parts) module to be combined between the actuator Actu and the piston arrangement having the piston and shaft or a scissors type suspension. The Mechanism can also be in the actuator Actu as a part of it in an embodiment variant.

In the example, the Hall sensor is drawn directly attached to the motor M, but is not necessarily at the direct contact to it. It is sufficient to have such a distance to the motor that a measurable signal from the Hall-sensor associated to the motor M's magnetic field and changes thereof can be provided to the solar controller SC of the SOAS-system.

According to an embodiment variant of example in FIG. 5, it is possible to provide such a Mechanism that changes the direction of the rotation of the motor shaft so that the piston can rotate around the piston connected Shaft. Such Mechanism can comprise a gearbox that makes the shaft and the piston to spin. Although the piston being drawn as a rectangular geometry, the FIG. 5 also represent such geometries, in which the press is round facilitating a tight spin in the press.

Provided, that in an embodiment variant, the piston were having a trapezoidal cross section, as demonstrated by the dashed line at the piston down part. The piston as such having round shape for a spin, so that the round shape is enabling the movement of the piston in a round trash bin tightly up and down, but also when spinning, the torque provided to the piston by the motor unit may also provide a spinning movement being used to move the trash in the press sideways along an annular path. In such embodiment that facilitates the trashes in the press being moved in a (horizontally) sideways direction as indicated, facilitates also simultaneously the trash being compressed.

The scope of the disclosure is defined in the following patent claims. However, it is clear to a skilled person in the art that different features of the disclosed invention and the related details can vary without departure from the inventional concept of the disclosure and related embodiments.

The invention claimed is:

1. A solar operated actuator system (SOAS) comprising:
   a solar panel (SoPa);
   a solar controller (SC) comprising
      an input for power feed (Inp) from the solar panel (SoPa) for the solar controller (SC) powering,
      at least one sensor input in an ensemble of sensor inputs (sein) for providing sensor data to the solar controller (SC),
      a functional connection (FCC) to control the solar panel produced electricity for an accumulator charging, and
      a functional connection (CHIF) to control an accumulator-laden charge for an actuator operation;
   an actuator (Actu) to be operated by an accumulator (Accu) laden electricity in controlling the solar controller (SC); and
   an accumulator (Accu) to store and discharge electricity for the actuator (Actu) of the system (SOAS), in the control of said solar controller (SC),
      wherein the solar panel (SoPa) provides electricity for charging of the accumulator (Accu) in the control of said solar controller (SC) and/or to said solar controller (SC) itself.

2. The solar operated actuator system (SOAS) of claim 1, wherein the system (SOAS) comprises an ensemble of sensors (sein) arranged to provide measurement data (T, P), (Hum), (Hall) for the solar controller (SC) to be used in optimization of the actuator (Actu) operation with the accumulator (Accu) laden electricity.

3. The solar operated actuator system (SOAS) of claim 1, wherein in an ensemble of sensors (sein) there is at least one of the following: light flux sensor (lf), temperature sensor (T, P), pressure sensor (T, P), air humidity sensor (Hum), wind speed sensor (WS) and a Hall-sensor (Hall).

4. The solar operated actuator system (SOAS) according to claim 1, wherein the actuator (Actu) comprises a DC-motor of a type of rotational or translational type.

5. The solar operated actuator system (SOAS) according to claim 1, wherein the solar operated actuator system (SOAS) has a part of a garbage press (CP).

6. The solar operated actuator system (SOAS) according to claim 1, wherein the solar operated actuator system (SOAS) has a part of a trash bin with a garbage press (CP).

7. The solar operated actuator system (SOAS) according to claim 1, wherein the solar controller (SC) is arranged to power up and/or power down at least one of said functional connections (FCC), (CHIF).

8. The solar operated actuator system (SOAS) according to claim 7, wherein the power up and/or power down are/is based on accumulator charging state based threshold value.

9. The solar operated actuator system (SOAS) according to claim 1, wherein the solar controller (SC) in the system is configured first to power up and/or last to power down in the system.

10. The solar operated actuator system (SOAS) according to claim 1, wherein the solar controller (SC) is powered up by the solar panel (SoPa) from a power down state.

11. A non-transitory computer readable medium on which is stored computer code comprising instructions and/or algorithms (SW) that, when executed by a computer, control operations of the solar controller of the solar operated actuator system (SOAS) according to claim 1.

\* \* \* \* \*